(12) United States Patent
Gane et al.

(10) Patent No.: US 8,470,181 B2
(45) Date of Patent: *Jun. 25, 2013

(54) SURFACE-REACTED CALCIUM CARBONATE IN COMBINATION WITH HYDROPHOBIC ADSORBENT FOR WATER TREATMENT

(75) Inventors: Patrick A. C. Gane, Rothrist (CH); Joachim Schölkopf, Killwangen (CH); Daniel Gantenbein, Gempen (CH)

(73) Assignee: Omya Development AG, Oftringen (CH)

( * ) Notice: Subject to any disclaimer, the term of this patent is extended or adjusted under 35 U.S.C. 154(b) by 403 days.

This patent is subject to a terminal disclaimer.

(21) Appl. No.: 12/451,406

(22) PCT Filed: Jun. 6, 2008

(86) PCT No.: PCT/EP2008/057071
§ 371 (c)(1),
(2), (4) Date: Nov. 10, 2009

(87) PCT Pub. No.: WO2008/151991
PCT Pub. Date: Dec. 18, 2008

(65) Prior Publication Data
US 2010/0133195 A1    Jun. 3, 2010

(30) Foreign Application Priority Data

Jun. 15, 2007 (EP) .................................. 07110381

(51) Int. Cl.
*C02F 1/28* (2006.01)
*B01D 15/04* (2006.01)

(52) U.S. Cl.
USPC ........... 210/691; 210/692; 210/693; 210/694; 502/417

(58) Field of Classification Search
USPC .................................. 210/691–694; 502/417
See application file for complete search history.

(56) References Cited

U.S. PATENT DOCUMENTS 2,613,181 A   10/1952   Green et al.
3,890,225 A    6/1975   Kajiyama
(Continued)

FOREIGN PATENT DOCUMENTS

CZ   9300287 A3   1/1995
DE   38 00 873 A1   7/1988
(Continued)

OTHER PUBLICATIONS

Pilchowski et al. "Adsorptive separation of 1,2-dichlorethane from model wastewater by natural clinoptilolite." Acta Hydrochim. Hydrobiol. 31 (2003) 3, 249-252.

(Continued)

*Primary Examiner* — Chester Barry
(74) *Attorney, Agent, or Firm* — Amster, Rothstein & Ebenstein LLP

(57) ABSTRACT

The present invention relates to a process for reducing the amount of organic components in water, wherein a surface-reacted naturalcalcium carbonate and a hydrophobic adsorbent, selected from the group consisting of talc, hydrophobized calcium carbonate, hydrophobized bentonite, hydrophobized kaolinite, hydrophobized glass, or any mixture thereof, are brought into contact with the water to be purified, the surface-reacted natural calcium carbonate being the reaction product of a naturalcalcium carbonate with an acid and carbon dioxide, which is formed in situ by the acid treatment and/or supplied externally, and the surface-reacted natural calcium carbonate being prepared as an aqueous suspension having a pH of greater than 6.0, measured at 20° C.

36 Claims, 2 Drawing Sheets

U.S. PATENT DOCUMENTS

| | | | |
|---|---|---|---|
| 4,343,706 | A | 8/1982 | Etzel et al. |
| 4,416,780 | A | 11/1983 | Disselbeck |
| 5,580,458 | A | 12/1996 | Yamasaki et al. |
| 6,210,526 | B1 | 4/2001 | Pohlen |
| 6,319,412 | B1 | 11/2001 | Reyna |
| 6,666,953 | B1 | 12/2003 | Gane et al. |
| 7,972,479 | B2 | 7/2011 | Gane et al. |
| 8,057,683 | B2 | 11/2011 | Gane et al. |
| 8,066,884 | B2 | 11/2011 | Gane et al. |
| 2002/0100718 | A1 | 8/2002 | Yamasaki et al. |
| 2003/0196966 | A1 | 10/2003 | Hughes |
| 2004/0020410 | A1 | 2/2004 | Gane |
| 2004/0238454 | A1 | 12/2004 | Mori et al. |
| 2005/0175577 | A1 | 8/2005 | Jenkins et al. |
| 2006/0048908 | A1 | 3/2006 | Wang et al. |
| 2006/0186054 | A1 | 8/2006 | Webb et al. |
| 2010/0086987 | A1 | 4/2010 | Gane et al. |
| 2011/0193011 | A1 | 8/2011 | Gane et al. |
| 2011/0195837 | A1 | 8/2011 | Gane et al. |
| 2011/0209841 | A1 | 9/2011 | Gane et al. |

FOREIGN PATENT DOCUMENTS

| | | | |
|---|---|---|---|
| EP | 0410877 | A1 | 1/1991 |
| EP | 0 989 229 | A1 | 3/2000 |
| EP | 1 186 343 | A1 | 3/2002 |
| EP | 1 607 373 | A1 | 12/2005 |
| GB | 410739 | | 5/1934 |
| GB | 662646 | | 8/1948 |
| GB | 786647 | | 11/1957 |
| GB | 1192063 | | 5/1970 |
| GB | 1518357 | | 7/1978 |
| JP | 4131198 | A | 5/1992 |
| JP | 6322911 | | 11/1994 |
| JP | 9038414 | A | 2/1997 |
| JP | 2000140834 | | 5/2000 |
| JP | 2002346572 | | 12/2002 |
| NL | 6 801 603 | A | 10/1968 |
| WO | 9526932 | | 10/1995 |
| WO | 0039222 | | 7/2000 |
| WO | WO 02/055596 | | 7/2002 |
| WO | 02064703 | | 8/2002 |
| WO | 2004083316 | A | 9/2004 |
| WO | 2005042412 | A1 | 5/2005 |
| WO | 2005121257 | A2 | 12/2005 |

OTHER PUBLICATIONS

International Search Report for PCT Application No. PCT/EP2008/057071.

Written Opinion of the International Searching Authority for PCT Application No. PCT/EP2008/057071.

Teir et al. "Production of Precipitated Calcium Carbonate from Calcium Silicates and Carbon Dioxide." Energy Conversion and Management 46 (2005) 2954-2979.

Snyder et al. Role of Membranes and Activated Carbon in the Removal of Endocrine Disruptors and Pharmaceuticals. Desalination 202 (2007) 156-181.

Office Action of U.S. Appl. No. 12/449,885 dated Dec. 7, 2011.

Sukhorukov et al., entitled "Porous calcium carbonate microparticles as templates for encapsulation of bioactive compounds," 2004, J. Mater. Chem., vol. 14, pp. 2073-2081.

Wei et al, entitled "High Surface Area Calcium Carbonate: Pore Structural Properties and Sulfation Characterisitcs," 1997, Ind. Eng. Chem. Res., vol. 36, pp. 2141-2148.

Zhang et al. "Removal of estrone and 17β-estradiol from water by adsorption" Water Research 39 (2005) pp. 3991-4003.

Tsai et al. "Adsorption of bisphenol-A from aqueous solution onto minerals and carbon adsorbents." J. of Hazardous Materials B134 (2006), pp. 169-175.

SURFACE-REACTED CALCIUM CARBONATE IN COMBINATION WITH HYDROPHOBIC ADSORBENT FOR WATER TREATMENT

This is a U.S. national phase of PCT Application No. PCT/EP2008/057071, filed Jun. 6, 2008, which claims the benefit of European Application No. 07110381.6, filed Jun. 15, 2007.

The present invention relates to a process for reducing the amount of organic components in water using a surface-reacted natural calcium carbonate in combination with a hydrophobic adsorbent.

There is a wide range of water purification techniques that can be used to remove fine particulate solids, micro-organisms and dissolved inorganic and organic materials. The choice of method will depend on the quality of the water being treated, the cost of the treatment process and the quality standards expected of the processed water.

Of particular concern in water treatment are organic contaminations. As many organic contaminations are toxic or at least represent a toxicological risk, they should be removed from waste water as completely as possible. High surfactant levels raise significant problems in waste water management as the surfactants might damage microorganisms used in waste water treatment plants and in the environment. The use of antifoaming agents is expensive and might again have a detrimental effect on microorganisms and other flora and fauna. Furthermore, even in industrial process water which is used in a closed circuit of a plant, the presence of high levels of organic compounds might have detrimental effects. The organic contaminations can also be adsorbed on the surface of machine members, thereby adversely affecting machine performance. In the case where surfactant level gets too high, for example, the process water will have a strong foaming tendency, again adversely affecting process performance.

At present, there are different strategies for reducing the amount of organic contaminants in waste water or process water such as flocculation, adsorption on specific adsorbents such as activated carbon, or oxidation by exposure to UV light.

Flocculation is widely employed in the purification of water such as industrial waste water or drinking water. Flocculation refers to a process where dissolved compounds and/or colloidal particles are removed from the solution in the form of flocs or "flakes." The term is also used to refer to the process by which fine particulates are caused to clump together into a floc. The floc may then float to the top of the liquid, settle to the bottom of the liquid, or can be readily filtered from the liquid.

Flocculants, or flocculating agents, are chemicals that are used to promote flocculation. Flocculants are used in water treatment processes to improve the sedimentation or filterability of small particles. Many flocculants are multivalent cations such as aluminium, iron, calcium or magnesium. These positively charged atoms interact with negatively charged particles and molecules to reduce the barriers to aggregation. In addition, many of these chemicals, under appropriate pH and other conditions, react with water to form insoluble hydroxides which, upon precipitating, link together to form long chains or meshes, physically trapping small particles into the larger floc.

A common flocculant or coagulant used is aluminium sulfate which reacts with water to form flocs of aluminium hydroxide. Coagulation with aluminum compounds may leave a residue of aluminium in the finished water. Aluminium can be toxic to humans at high concentrations.

Another aluminium-based coagulant is polyaluminium chloride (PAC). In solutions of poly-aluminium chloride (PAC), aluminium ions form into polymers consisting of clusters of ions bridged by oxygen atoms. PAC is used e.g. for the treatment of brown drinking water comprising organic materials such as leaves and/or inorganic materials such as iron and manganese compounds which cause the brown discolouration. However, PAC is generally not sufficient to efficiently remove brown discolouration from the water.

Iron(III) chloride is another common coagulant. Iron(III) coagulants work over a larger pH range than aluminum sulfate but are not effective with many source waters. Coagulation with iron compounds typically leaves a residue of iron in the finished water. This may impart a slight taste to the water, and may cause brownish stains on porcelain fixtures. Furthermore, iron(III) chloride presents corrosion risks in the water treatment system.

With reference to the domain of waste water treatment, the skilled man knows GB1518357, which relates to a process for purifying industrial and/or agricultural waste water highly polluted with organic substances, which comprises mixing the waste water with sufficient alkalizing agent containing calcium to raise the pH above 9, thereafter saturating the water with carbon dioxide, coagulating the resulting precipitate by mixing the treated water with a coagulating agent and separating the coagulated precipitate from the water.

The skilled man also knows EP0410877, which relates to a composition of matter for the chemical and biological purification of contaminated waters, said composition being destined to be spread in the water to be purified and characterised in that it comprises at least two of the following materials in granular form:—a porous calcium carbonate rich in oligoelements,—an alumina silicate hydrate containing alkaline earth metals. These two materials contain in the adsorbed state specific bacteria for the biological degradation of organic materials containing a carbon chain.

Also in this domain, the abstract of JP63229111 discloses a microparticle powder of calcium carbonate or crushed charcoal with a grain size of 0.05-0.001 mm used as a flocculant for water purification.

FR2666080 discloses an inorganic composition based on aluminium salt for water purification treatment, characterised in that it is in the form of a powder consisting of a mixture of aluminium salt and of calcium carbonate.

The abstract of JP4131198 discloses a waste water purification process wherein waste water is exposed to an air dispersed as particles in a size of 0.5-10 micrometers. The air dispersed as the particles stirs the waste water sufficiently to promote the flocculation. A liquid, containing minerals extracted from weathered granites and the like, is injected into an acidic medium to obtain 100-3000 ppm of a primary treatment water. A neutralized secondary treatment water is caused to float under pressure and stirred to remove a sludge and a tertiary treatment water is filtered by a means comprising a granulate of minerals such as calcium carbonate and a granular active carbon.

The abstract of JP9038414 discloses a flocculating precipitant containing coarse particles of calcium carbonate having 50-500 micrometers average particle diameter and fine particles of calcium carbonate having 1-30 micrometers average particle diameter.

WO 95/26932 discloses a method for treating water contaminated with algae, suspended solids, or toxic heavy metal compounds, said method comprising the steps: (a) adding to the water a soluble metal salt flocculant in a quantity of between 5-100 milligrams per liter of the water; (b) adding to the water 50-2000 milligrams of coccolithic calcium carbonate per liter of water; and (c) forming a floc including said algae, suspended solids, or toxic heavy metal compounds in said water at a pH of at least about 7.0.

GB410739 discloses a process for the purification and decolourisation of water wherein the water is successively or simultaneously passed in contact with a substantially insoluble mild acid-neutralising agent such as, among others, calcium carbonate, and a defined adsorptive agent.

The skilled man is also aware of documents relating to the specific removal of fluorides from waste water. In this context, he knows GB786647, which relates to a method for the removal of fluorides dissolved in water which method comprises subjecting the water to treatment at a temperature of 50° C. or more with ti-calcium ortho-phosphate, and calcium carbonate and/or magnesium carbonate.

In this context, he also knows U.S. Pat. No. 5,580,458, which relates to a method for waste water treatment, comprising the steps of: (a) introducing fluorine-containing waste water into a first tank packed with a calcium carbonate mineral; (b) agitating said fluorine-containing waste water in the first tank through aeration by diffused air to cause fluorine in the waste water to react with the calcium carbonate mineral to form flocs of calcium fluoride, said calcium carbonate mineral being also aerated by the diffused air; (c) introducing the waste water from the first tank to a second tank packed with a calcium carbonate mineral; (d) agitating the waste water in the second tank through aeration by diffused air to cause fluorine in the waste water to react with the calcium carbonate mineral to form flocs of calcium fluoride, said calcium carbonate mineral being also aerated by the diffused air, said aeration being sufficient to cause airborne microorganisms to accumulate said fluorine in said waste water in vivo; and (e) separating the flocs from the waste water.

Finally, the skilled man knows US 2002/100718, which relates to a waste water treatment method for treating a fluorine waste water containing organic matter, nitrogen, phosphorus and hydrogen peroxide by introducing the waste water into an anaerobic tank and an aerobic tank, comprising: a calcium carbonate mineral placed in the anaerobic tank; a biologically treated water of another system introduced into the aerobic tank; and a calcium carbonate mineral placed in the aerobic tank.

There is still a need for a water treatment process which is effectively removing organic contaminations but still enables easy performance at low costs.

According to a first aspect of the present invention, the object is solved by providing a process for reducing the amount of organic components in water, wherein a surface-reacted natural calcium carbonate and a hydrophobic adsorbent, selected from the group consisting of talc, hydrophobised calcium carbonate, hydrophobised bentonite, hydrophobised kaolinite, hydrophobised glass, or any mixture thereof, are brought into contact with the water to be purified, the surface-reacted natural calcium carbonate being the reaction product of a natural calcium carbonate with an acid and carbon dioxide, which is formed in-situ by the acid treatment and/or supplied externally, and the surface-reacted natural calcium carbonate being prepared as an aqueous suspension having a pH of greater than 6.0, measured at 20° C.; and wherein the at least one organic component does not include pitch. This means that the water to be treated according to the first aspect of the present invention does not comprise pitch, e.g. from the papermaking or pulping process.

In the context of the present invention, the term "organic component" has to be interpreted broadly and encompasses specific organic compounds such as surfactants, polycyclic compounds, cholesterol, or endocrine disrupting compounds as well as more complex organic materials (e.g. organic material from microorganisms).

Preferably, the water to be purified includes at least one of the following organic components which are selected from the group consisting of surfactants; cholesterol; endocrine disrupting compounds; amino acids; proteins; carbohydrates; defoamers; sizing agents selected from the group consisting of alkyl ketene dimer (AKD), alkenyl succinic anhydride (ASA), or mixtures thereof; polyvinylacetates; polyacrylates, in particular polyacrylate latex; styrene butadiene copolymers, in particular styrene butadiene latex; microorganisms; mineral oils; vegetable oils and fats; or any mixture thereof.

As indicated above, in the process according to the first aspect of the present invention the organic components do not comprise pitch.

The term "pitch" as used in the present invention refers to a specific type of organic material generated in the papermaking or pulping process. The primary fibre source in papermaking is wood, which is reduced to its constituent fibres during pulping by combinations of grinding, thermal and chemical treatment. During this process the natural resin contained within the wood is released into the process water in the form of microscopic droplets. These droplets are referred to as pitch. The chemical composition of pitch is generally divided into four classes of lipophilic components: fats and fatty acids; steryl esters and sterols; terpenoids; and waxes. The chemical composition depends on the fibre source, such as variety of tree, and on the seasonal growth from which the sample is produced.

According to a second aspect of the present invention, the object is solved by providing a process for reducing the amount of organic components in water, wherein a surface-reacted natural calcium carbonate and a hydrophobic adsorbent, selected from the group consisting of talc, hydrophobised calcium carbonate, hydrophobised bentonite, hydrophobised kaolinite, hydrophobised glass, or any mixture of thereof, are brought into contact with the water to be purified, the surface-reacted natural calcium carbonate being the reaction product of a natural calcium carbonate with an acid and carbon dioxide, which is formed in situ by the acid treatment and/or supplied externally, and the surface-reacted natural calcium carbonate being prepared as an aqueous suspension having a pH of greater than 6.0, measured at 20° C.; and wherein the at least one organic component is selected from the group consisting of surfactants; cholesterol; endocrine disrupting compounds; amino acids; proteins; carbohydrates; defoamers; sizing agents selected from the group consisting of alkyl ketene dimer (AKD), alkenyl succinic anhydride (ASA), or mixtures thereof; polyvinylacetates; polyacrylates such as polyacrylate latex; styrene-butadiene copolymers such as styrene-butadiene latex; microorganisms; mineral oils; vegetable oils or fats; or any mixture thereof.

In the process according to the second aspect of the present invention, the water to be treated might comprise pitch in addition to the organic components mentioned above.

The following statements apply to the process according to the first aspect as well as to the process according to the second aspect of the present invention.

Preferably, the organic components to be removed by the process of the present invention are amphiphilic, i.e. these compounds have at least one hydrophilic part and at least one lipophilic part within the same molecule. Thus, it is preferred that the organic components listed above are chosen under the condition that they are of amphiphilic character.

Preferably, the hydrophilic part comprises at least one polar and/or ionic functional group such as a hydroxyl, amine, carboxylic acid, carboxylic acid anhydride, amide, nitrile, carboxylate, or ammonium group. Preferably, the lipophilic part comprises at least two carbon atoms, more preferably at least four or even six carbon atoms which are bonded to each other, e.g. in the form of a linear or branched alkyl or alkylene group, but not bonded to a polar and/or ionic functional group.

In a preferred embodiment, the defoamer; the sizing agent selected from the group consisting of alkyl ketene dimer (AKD), alkenyl succinic anhydride (ASA), or mixtures thereof; the polyvinylacetate; the polyacrylate such as polyacrylate latex; the styrene-butadiene copolymer such as styrene-butadiene latex are selected from the group of stickies.

Stickies are potentially deposit-forming components originating from recycled paper. In general, examples are glues, hot-melt plastics, printing inks, and latex. The papermaking industry utilizes various amounts of recycled fiber or papers as a source of paper fiber furnish in the production of finished paper products. The recycled papers are often contaminated with the synthetic polymeric materials outlined above and these polymeric materials are referred to as stickies in the papermaking art. Stickies are different from pitch which is a naturally occurring resinous material from the extractive fraction of wood. Reference is made to E. L. Back and L. H. Allen, "Pitch Control, Wood Resin and Deresination", Tappi Press, Atlanta, 2000, wherein stickies are described in further detail. As indicated above, beneficial results are obtained with the process of the present invention if the water to be treated comprises defoamers; sizing agents selected from the group consisting of alkyl ketene dimer (AKD), alkenyl succinic anhydride (ASA), or mixtures thereof; polyvinylacetates; polyacrylates such as polyacrylate latex; styrene-butadiene copolymers such as styrene-butadiene latex, which are selected from the group of stickies.

Preferably, the organic component is a surfactant. The surfactant can be ionic or non-ionic. If the surfactant is anionic, it can have a functional group selected from carboxylate, sulfate, or sulfonate. If the surfactant is cationic, its functional group can be a quaternary ammonium group.

If the water to be treated comprises endocrine disrupting compounds, these are preferably selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

If the water to be treated comprises a defoamer, it can be an ethylene oxide glycol ether, a silicone oil based defoamer, a fatty acid ester defoamer, or any mixture thereof. As indicated above, the defoamer is preferably selected from stickies.

If the water to be treated comprises microorganisms, these are preferably selected from bacteria, fungi, archaea or protists.

Preferred vegetable oils are edible oils such as coconut oil, corn oil, cottonseed oil, canola oil, palm oil, soybean oil, or sunflower oil.

The water preferably treated by the process of the present invention includes industrial process water, industrial waste water, drinking water, urban waste water, waste water or process water from breweries or from other beverage industries, or waste water or process water in the paper industry.

Within the context of the present invention, the term "process water" refers to any water which is necessary to run or maintain an industrial process. The term "waste water" refers to any water drained from its place of use, e.g. an industrial plant.

The Surface-Reacted Natural Calcium Carbonate

The surface-reacted natural calcium carbonate to be used in the process of the present invention is obtained by reacting a natural calcium carbonate with an acid and with carbon dioxide, wherein the carbon dioxide is formed in-situ by the acid treatment and/or is supplied from an external source.

Preferably, the natural calcium carbonate is selected from a marble, a chalk, a calcite, a dolomite, a limestone, or mixtures thereof. In a preferred embodiment, the natural calcium carbonate is ground prior to the treatment with an acid and carbon dioxide.

The grinding step can be carried out with any conventional grinding device such as a grinding mill known to the skilled person.

The surface-reacted natural calcium carbonate to be used in the water purification process of the present invention is prepared as an aqueous suspension having a pH, measured at 20° C., of greater than 6.0, preferably greater than 6.5, more preferably greater than 7.0, even more preferably greater than 7.5. As will be discussed below, the surface-reacted natural calcium carbonate can be brought into contact with the water to be purified by adding said aqueous suspension to the water. It is also possible to modify the pH of the aqueous suspension prior to its addition to the water to be purified, e.g. by dilution with additional water. Alternatively, the aqueous suspension can be dried and the surface-reacted natural calcium carbonate brought into contact with the water is in powder form or in the form of granules. In other words, the increase of pH to a value of greater than 6.0 subsequent to treatment with an acid and carbon dioxide is needed to provide the surface-reacted calcium carbonate having the beneficial adsorption properties described herein.

In a preferred process for the preparation of the aqueous suspension, the natural calcium carbonate, either finely divided (such as by grinding) or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step, an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulfuric acid, hydrochloric acid, or mixtures thereof. If the $pK_a$ at 25° C. is from 0 to 2.5, the acid is preferably selected from $H_2SO_3$, $HSO_4^-$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step, the natural calcium carbonate is treated with carbon dioxide. If a strong acid such as sulfuric acid or hydrochloric acid is used for the acid treatment of the natural calcium carbonate, the carbon dioxide is automatically formed.

Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH of greater than 7, the pH of the aqueous suspension may be increased to a value greater that 6 by adding a base subsequent to carbon dioxide treatment. Any conventional base such as sodium hydroxide or potassium hydroxide can be used.

With the process steps described above, i.e. acid treatment, treatment with carbon dioxide and pH adjustment, a surface-reacted natural calcium carbonate having good adsorption properties is obtained.

Further details about the preparation of the surface-reacted natural calcium carbonate are disclosed in WO 00/39222 and US 2004/0020410 A1, the content of these references herewith being included in the present application. According to these documents, the surface-reacted natural calcium carbonate is used as a filler for paper manufacture.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide. Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

The surface-reacted natural calcium carbonate can be kept in suspension, optionally further stabilised by a dispersant. Conventional dispersants known to the skilled person can be used. The dispersant can be anionic or cationic. A preferred dispersant is polyacrylic acid.

Alternatively, the aqueous suspension described above can be dried, thereby obtaining the surface-reacted natural calcium carbonate in the form of granules or a powder.

In a preferred embodiment, the surface-reacted natural calcium carbonate has a specific surface area of from 5 $m^2/g$ to 200 $m^2/g$, more preferably 20 $m^2/g$ to 80 $m^2/g$ and even more preferably 30 $m^2/g$ to 60 $m^2/g$, measured using nitrogen and the BET method according to ISO 9277.

Furthermore, it is preferred that the surface-reacted natural calcium carbonate has a weight median grain size diameter, $d_{50}$, of from 0.1 to 50 µm, more preferably from 0.5 to 25 µm, even more preferably 0.7 to 7 µm, measured according to the sedimentation method. The measurement of weight median grain diameter was performed on a Sedigraph 5100™ instrument, as described in further detail in the experimental section below.

In a preferred embodiment, the surface-reacted natural calcium carbonate has a specific surface area within the range of 15 to 200 $m^2/g$ and a weight median grain diameter within the range of 0.1 to 50 µm. More preferably, the specific surface area is within the range of 20 to 80 $m^2/g$ and the weight median grain diameter is within the range of 0.5 to 25 µm. Even more preferably, the specific surface area is within the range of 30 to 60 $m^2/g$ and the weight median grain diameter is within the range of 0.7 to 7 µm.

Preferably, the surface-reacted natural calcium carbonate has an intra-particle porosity within the range of 20% vol to 40% vol, measured by mercury porosimetry. Details about the measuring method are provided below in the experimental section.

The Hydrophobic Adsorbent

In addition to the surface-reacted natural calcium carbonate described above, the water to be purified needs to be brought into contact with a hydrophobic adsorbent selected from the group consisting of talc, hydrophobized calcium carbonate, hydrophobized bentonite, hydrophobized kaolinite, hydrophobized glass, or a mixture thereof.

(a) Talc

Talcs which are useful in the present invention are any commercially available talcs, such as, e.g. talcs from Sotkamo (Finland), Three Springs (Australia), Haicheng (China), from the Alpes (Germany), Florence (Italy), Tyrol (Austria), Shetland (Scotland), Transvaal (South Africa), the Appalachians, California, Vermont and Texas (USA), Norway.

Depending on the origin of the coarse talc, there may be several impurities contained therein such as chlorite, dolomite and magnesite, amphibole, biotite, olivine, pyroxene, quartz and serpentine.

Preferred for the use in the present invention are talcs having a content of pure talc of >90 weight-%, for example >95 weight-% or >97 weight-% and up to >100 weight-%.

The composition and purity of the talcs useful in the present invention were analysed by X-ray fluorescence (XRF) (ARL 9400 Sequential XRF) and X-ray diffraction (XRD) (from 5-100° 2theta Bragg diffraction using a Bruker AXS D8 Advanced XRD system with CuKα radiation, automated divergence slits and a linear position-sensitive detector. The tube current and voltage were 50 mA and 35 kV, respectively: the step size was 0.02° 2theta and the counting time 0.5 s·$step^{-1}$).

The talc particles used in the present invention may have a $d_{50}$ value, measured according to the sedimentation method as described above, in the range of 0.1 to 50 µm, e.g. 0.2 to 40 µm, preferably 0.3 to 30 µm, more preferably 0.4 to 20 µm, particularly 0.5 to 10 µm, e.g. 1, 4 or 7 µm.

The specific surface area of the talc can be between 3 and 100 m$^2$/g, preferably between 7 m$^2$/g and 80 m$^2$/g more preferably between 9 m$^2$/g and 60 m$^2$/g, e.g. 51 m$^2$/g, especially between 10 and 50 m$^2$/g, for example 30 m$^2$/g, measured using nitrogen and the BET method according to ISO 9277.

The talc can be used in powder form. As an alternative, it can be kept in suspension, optionally further stabilised by a dispersant. Conventional dispersants known to the skilled person can be used. The dispersant can be anionic or cationic.

(b) Hydrophobized Calcium Carbonate

Either as an alternative or in addition to one or more of the other hydrophobic adsorbents, hydrophobized calcium carbonate can be used as a hydrophobic adsorbent.

Hydrophobising of calcium carbonate can be effected by any conventional hydrophobising process known to the skilled person. In this context, reference is made to the disclosure of EP-A-1 362 078, GB 1,192,063, and WO 2005/121257.

In a preferred embodiment, the hydrophobising agent used for the treatment of calcium carbonate is of the formula R—X, wherein R is a hydrocarbon residue having 8 to 24 carbon atoms, preferably selected from alkyl, alkylaryl, arylalkyl, aryl, and X represents a functional group, preferably selected from the group consisting of carboxylate, amine, hydroxyl, or phosphonate. More preferably, the hydrophobising agent of the formula R—X is selected from fatty acids, fatty amines, or fatty alcohols.

In a preferred embodiment, hydrophobising is accomplished by treatment of calcium carbonate with fatty acids, polysiloxanes such as polydialkylsiloxanes, or mixtures thereof, as described in the documents cited above.

Preferably, the hydrophobised calcium carbonate is obtained by treatment of calcium carbonate with a fatty acid or a mixture of fatty acids having 10 to 24 carbon atoms. Preferably, the fatty acid is stearic acid, palmitic acid, behenic acid, or any mixture thereof.

The calcium carbonate subjected to a hydrophobising treatment can be selected from natural calcium carbonate, precipitated calcium carbonate or ground natural calcium carbonate.

Preferably, the calcium carbonate subjected to a hydrophobising treatment is a natural surface-reacted calcium carbonate as described above.

The degree of hydrophobising (X) can be adjusted by the percentage of available specific surface area covered by the hydrophobising agent described above, in particular fatty acids. Preferably, at least 20% of the specific surface area of the calcium carbonate is covered by the hydrophobising agent. In other preferred embodiments, at least 30%, at least 40%, or at least 50% of the specific surface area is covered by the hydrophobizing agent.

Preferably, the degree of hydrophobising is adjusted to a value still enabling the formation of a suspension of the hydrophobic adsorbent particles in the water to be treated under a reasonable degree of agitation. Flotation of the hydrophobic adsorbent on the water surface even under a reasonable degree of agitation should be avoided.

If fatty acids are used for hydrophobising, the degree of surface coverage can be calculated with the following formula:

$$X = \lambda m_{Exp}/(M_{FA} * A_s * n_A) \text{ wherein}$$

X: degree of hydrophobising
$\lambda m_{Exp}$: Experimental mass loss in TGA between 150° C. and 400° C.
$M_{FA}$: Molecular mass of the fatty acid
$A_s$: Specific surface area of the mineral particle
$n_A$: Fatty acid molecules needed to cover 1 m$^2$ of the mineral. Usually 8 μmol*m$^{-2}$ for fatty acids.

(c) Hydrophobised Bentonite

Either as an alternative or in addition to one or more of the other hydrophobic adsorbents, hydrophobized bentonite can be used as a hydrophobic adsorbent.

Bentonite is an adsorbent aluminium phyllosilicate generally impure clay consisting mostly of montmorillonite, (Na, Ca)$_{0.33}$(Al, Mg)$_2$Si$_4$O$_{10}$(OH)$_2$.(H$_2$O)$_n$.

Most high grade commercial sodium bentonite mined in the United States comes from the area between the Black Hills of South Dakota and the Big Horn Basin of Montana. Sodium bentonite is also mined in the southwestern United States, in Greece and in other regions of the world. Calcium bentonite is mined in the Great Plains, Central Mountains and south eastern regions of the United States. Supposedly the world's largest current reserve of bentonite is Chongzuo in China's Guangxi province.

The hydrophobised bentonite is preferably prepared by treating bentonite in water with quaternary ammonium compounds and/or alkylamines. The hydrophobised bentonite, i.e. a bentonite preferably comprising ammonium compounds and/or alkylamines which are intercalated in between the clay layers and/or adsorbed on the outer surface, can then be separated by sedimentation, filtration, or any other commonly known separation process.

Preferred quaternary ammonium compounds are $C_1$-$C_{24}$ alkyl trimethylammonium halides such as cetyltrimethylammonium bromide, octadecyltrimethylammonium bromide, or tetramethylammonium bromide. Preferred alkylamines are $C_4$ to $C_{24}$ alkylamines.

(d) Hydrophobised Kaolinite

Either as an alternative or in addition to one or more of the other hydrophobic adsorbents, hydrophobized kaolinite can be used as a hydrophobic adsorbent.

Kaolinite is a clay mineral with the chemical composition Al$_2$Si$_2$O$_5$(OH)$_4$. It is a layered silicate mineral, with one tetrahedral sheet linked through oxygen atoms to one octahedral sheet of alumina octahedra. Rocks that are rich in kaolinite are known as china clay or kaolin. Kaolinite is one of the most common minerals; it is mined, as kaolin, in Brazil, France, United Kingdom, Germany, India, Australia, Korea, the People's Republic of China, and the southeastern U.S. states of Georgia, Florida, and, to a lesser extent, South Carolina. Kaolinite has a low shrink-swell capacity and a low cation exchange capacity (1-15 meq/100 g.) It is a soft, earthy, usually white mineral (dioctahedral phyllosilicate clay), produced by the chemical weathering of aluminium silicate minerals like feldspar. Alternating layers are sometimes found, as at Providence Canyon State Park in Georgia, USA.

Preferably, kaolinite is hydrophobised with silanes. The kaolinite can be hydrophobised as followed: 1.) treatment of the kaolinite in a solvent with the silane; 2.) direct treatment of the kaolinite in the silane at room temperature; or 3.) direct treatment of the kaolinite in the silane at the boiling point.

Preferred silanes are e.g. phenyltrimethoxysilane, octadecyltrichlorsilane, benzyltriethoxy-silane, aminobutyltriethoxysilane.

(e) Hydrophobised Glass

Either as an alternative or in addition to one or more of the other hydrophobic adsorbents, hydrophobized glass can be used as a hydrophobic adsorbent.

The glass particles useful in the present invention can be produced from any conventional glass in any conventional way. It may, e.g. be produced from waste glass, such as from conventional beverage bottles by crushing, e.g. in a jaw crusher such as a jaw crusher PULVERISETTE type 01.703 n° 706 available from Fritsch GmbH, Germany, and subsequent dry or wet grinding in a suitable mill such as a ball mill, e.g. dry grinding in an Alpine Labor-Kugelmühle type 1-25 LK using any conventional grinding balls which can be used for grinding glass, e.g. steel balls or steatite grinding balls having suitable sizes which are known to those skilled in the art. For example, a mixture of steatite grinding balls available from Befag Verfahrenstechnik AG having a size of 15 mm, 20 mm, and 28 mm can be used in a weight ratio of 12:74:14.

Also useful in the present invention are commercially available glass types such as Recofill® MG-450 glass powder available from Reidt GmbH & Co. KG, Germany.

Preferably, the hydrophobised glass is obtained by treatment of the glass described above with a fatty acid or a mixture of fatty acids. In this context, reference can be made to the fatty acid treatment as described above with respect to the hydrophobised calcium carbonate. Thus, it is preferred that the hydrophobised glass is obtained by treatment with a fatty acid or a mixture of fatty acids having 10 to 24 carbon atoms. Preferably, the fatty acid is stearic acid, palmitic acid, behenic acid, or any mixture thereof.

Preferably, the degree of hydrophobising is adjusted to a value still enabling the formation of a suspension of the hydrophobic adsorbent particles in the water to be treated under a reasonable degree of agitation. Flotation of the hydrophobic adsorbent on the water surface even under a reasonable degree of agitation should be avoided.

Preferably, the hydrophobic adsorbents discussed above have a weight median grain size diameter $d_{50}$ of 0.1 to 50 μm, more preferably 0.1 to 20 μm.

Preferably, the hydrophobic adsorbents discussed above have a specific surface area of 0.1 to 100 $m^2/g$, more preferably 2 to 100 $m^2/g$.

Water Treatment with a Combination of Surface-Reacted Natural Calcium Carbonate and a Hydrophobic Adsorbent In the process of the present invention, the surface-reacted natural calcium carbonate and the hydrophobic adsorbent can be brought into contact with the water to be purified by any conventional means known to the skilled person.

Preferably, the combined amount of surface-reacted natural calcium carbonate and hydrophobic adsorbent to be used for the water treatment is 0.1 to 10 wt %, more preferably 0.5 to 5 wt % and even more preferably 1 to 5 wt %, based on the total weight of the water to be treated.

The weight ratio of surface-reacted natural calcium carbonate to hydrophobic adsorbent might depend on the type of organic component to be removed. Preferred weight ratios of surface-reacted natural calcium carbonate to hydrophobic adsorbent are e.g. from 1:50 to 50:1, from 1:20 to 20:1 or from 1:5 to 5:1. More preferably, the weight ratio of surface-reacted natural calcium carbonate to hydrophobic adsorbent is from 1:2 to 2:1, even more preferably from 1:1.5 to 1.5:1. Most preferably, the weight ratio is 1:1.

Preferably, the surface-reacted natural calcium carbonate and the hydrophobic adsorbent are mixed, preferably in powder form, before being brought into contact with the water to be treated. Blending can be accomplished by any conventional means known to the skilled person.

Alternatively, the surface-reacted natural calcium carbonate and the hydrophobic adsorbent can be added to the water in separate steps.

The surface-reacted natural calcium carbonate can be added as an aqueous suspension, e.g. the suspension described above. Alternatively, it can be added to the water to be purified in any appropriate solid form, e.g. in the form of granules or a powder or in the form of a cake.

The hydrophobic adsorbent can also be added as an aqueous suspension, e.g. the suspension described above. Alternatively, it can be added to the water to be purified in any appropriate solid form, e.g. in the form of granules or a powder or in the form of a cake.

Within the context of the present invention, it is also possible to provide an immobile phase, e.g. in the form of a cake or layer, comprising the surface-reacted natural calcium carbonate and/or the hydrophobic adsorbent, the water to be treated running through said immobile phase.

In a preferred embodiment, the liquid to be purified is passed through a permeable filter comprising the surface-reacted natural calcium carbonate and the hydrophobic adsorbent and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising a number of tortuous passages of varying diameter and configuration retains impurities by molecular and/or electrical forces adsorbing the impurities onto the surface-reacted natural calcium carbonate and/or hydrophobic adsorbent which are present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

One option to introduce a depth filtration layer onto the surface filter is to suspend a flocculating aid in the liquid to be filtered, allowing this aid to subsequently decant such that it flocculates all or part of the impurities as it is deposited on a surface filter, thereby forming the depth filtration layer. This is known as an alluvium filtration system. Optionally, an initial layer of the depth filtration material may be pre-coated on the surface filter prior to commencing alluvium filtration.

Optional Additives

In a preferred embodiment of the present invention, a polymeric flocculant is added to the water to be purified subsequent to the addition of the surface-reacted natural calcium carbonate and the hydrophobic adsorbent. Preferably, the polymeric flocculant is added when adsorption of the organic component(s) has reached its maximum, i.e. there is no further decrease of impurities within the water. However, it is also possible to add the polymeric flocculant at an earlier stage, e.g. when at least 75%, at least 85% or at least 95% of maximum adsorption has been reached.

Any polymeric flocculant known in the art can be used in the process of the present invention. Examples of preferred polymeric flocculants include polyacrylamides or polyelectrolytes based on polyacrylates, polyethyleneimines, or mixtures of these, and natural polymers such as starch, or natural modified polymers like modified carbohydrates. Other preferred flocculants that can be mentioned are egg-white and gelatine.

The polymeric flocculant can be ionic or non-ionic.

Preferably, the polymeric flocculant has a weight average molecular weight of at least 100,000 g/mol. In a preferred embodiment, the polymeric flocculant has a weight average molecular weight within the range of 100,000 to 10,000,000 g/mol.

As already discussed above, the surface-reacted natural calcium carbonate and the hydrophobic adsorbent can be used in combination with a cationic polymeric flocculant as well with an anionic polymeric flocculant, thereby improving process flexibility in water treatment. Thus, in a preferred embodiment the polymeric flocculant which is added to the water subsequent to the addition of the surface-reacted natural calcium carbonate is cationic whereas in another preferred embodiment the polymeric flocculant is anionic.

In the context of the present invention, the term "cationic" refers to any polymer having a positive overall charge. Thus, the presence of some anionic monomer units is not excluded as long as there are still sufficient cationic monomer units providing a positive overall charge and enabling its use as a flocculant. Furthermore, the term "cationic polymeric flocculant" also comprises those polymers having monomer units with functional groups which become cationic upon addition to the water to be treated, e.g. amine groups becoming ammonium groups in acidic water.

The term "anionic" refers to any polymer having a negative overall charge. Thus, the presence of some cationic monomer units is not excluded as long as there are still sufficient anionic monomer units providing a negative overall charge and enabling its use as a flocculant. Furthermore, the term "anionic polymeric flocculant" also comprises those polymers having monomer units with functional groups which become anionic upon addition to the water to be treated, e.g. acid groups such as sulfonic acid groups.

A preferred polymeric flocculant of the present invention is polyacrylamide. By appropriate modifications which are known to the skilled person, the polyacrylamide can be used as a cationic flocculant as well as an anionic flocculant.

Preferably, the polyacrylamide contains at least 50 mol %, more preferably at least 60 mol %, even more preferably at least 75 mol % monomer units derived from acrylamide.

An anionic polyacrylamide, i.e. a polyacrylamide having a negative overall charge, can be obtained by introducing appropriate comonomer units, e.g. derived from (meth) acrylic acid.

A cationic polyacrylamide, i.e. a polyacrylamide having a positive overall charge, can be obtained by introducing appropriate comonomer units, e.g. derived from aminoalkyl(meth) acrylates such as dimethylaminomethyl(meth)acrylate, dimethylaminoethyl(meth)acrylate, dimethylaminopro-pyl (meth)acrylate, diethylaminomethyl(meth)acrylate, diethylaminoethyl(meth)acrylate or diethylaminopropyl (meth)acrylate which can be quaternised by alkyl halides.

In a preferred embodiment, the polyacrylamide has a weight average molecular weight within the range of 100 000 g/mol to 10 000 000 g/mol.

Optionally, further additives can be added to the water sample to be treated. These might include agents for pH adjustment and conventional flocculants such as polyaluminium chloride, iron chloride or aluminium sulphate. However, in a preferred embodiment, the water purification process of the present invention does not use any additional conventional inorganic flocculant such as polyaluminium chloride, iron chloride or aluminium sulphate.

Separation of the Adsorbents from the Treated Water

After the surface-reacted natural calcium carbonate and the hydrophobic adsorbent have settled, possibly assisted by the use of a flocculant, the settled material can be separated from the water sample by conventional separation means known to the skilled person such as sedimentation, centrifugation or filtration.

In the case of an immobile phase, comprising the surface-reacted natural calcium carbonate and the hydrophobic adsorbent, has been used, it can be replaced by a new immobile phase after adsorption of the organic components has been completed.

According to a further aspect of the present invention, a composite material is provided comprising the surface-reacted natural calcium carbonate and the hydrophobic adsorbent as defined above and at least one organic component. With regard to the definition of the organic component and preferred embodiments thereof, reference is made to the statements provided above when discussing the process according to the first aspect and the second aspect, respectively. Preferably, the organic component is amphiphilic. More preferably, it is a surfactant. In another preferred embodiment, the organic component is a defoamer; a sizing agent selected from the group consisting of alkyl ketene dimer (AKD), alkenyl succinic anhydride (ASA), or mixtures thereof; a polyvinylacetate; a polyacrylate such as polyacrylate latex; a styrene-butadiene copolymer such as styrene-butadiene latex; or any mixture thereof, wherein these organic components are selected from the group of stickies.

According to a further aspect, the present invention provides the use of the surface-reacted natural calcium carbonate as defined above in combination with the hydrophobic adsorbent as defined above for reducing the amount of organic components in water. With regard to the definition of these organic components and preferred embodiments thereof, reference is made to the statements provided above when discussing the process according to the first aspect and the second aspect, respectively. Preferably, the organic component is amphiphilic. More preferably, it is a surfactant. In another preferred embodiment, the organic component is a defoamer; a sizing agent selected from the group consisting of alkyl ketene dimer (AKD), alkenyl succinic anhydride (ASA), or mixtures thereof; a polyvinylacetate; a polyacrylate such as polyacrylate latex; a styrene-butadiene copolymer such as styrene-butadiene latex; or any mixture thereof, wherein these organic components are selected from the group of stickies.

The invention is now described in further detail by the following examples, which are not limiting the scope of the present invention.

EXAMPLES

Measuring Methods

Weight Median Grain Diameter ($d_{50}$)

Figure 1:
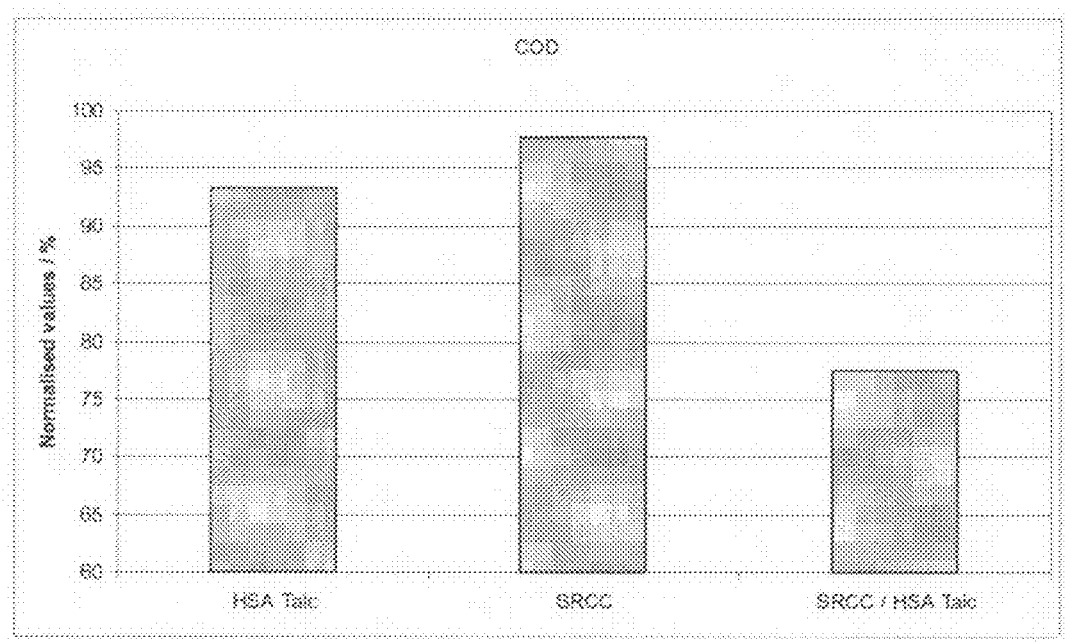
FIG. 1 shows normalised chemical oxygen demand (COD) values for the treated surfactant solution. 100% correspond to 546 mg $O_2$ per $dm^3$.

Weight median grain diameter and grain diameter distribution are determined via the sedimentation method, i.e. an analysis of sedimentation behaviour in a gravimetric field. The measurement is made with a Sedigraph™ 5100 of Microtronics. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and ultrasonic.

Specific Surface Area

The specific surface area is measured via the BET method according to ISO 9277 using nitrogen.

Chemical Oxygen Demand (COD)

The COD analysis expresses the quantity of oxygen necessary for the oxidation of organic materials into $CO_2$ and was measured using a Lange CSB LCK 014, range 100-1000 mg $dm^{-3}$ with a LASA 1/plus cuvette.

Total Organic Carbon (TOC)

TOC is the sum of organically bound carbon in dissolved and undissolved organic compounds. It was measured according to ISO 1484. A TOC analyzer from Shimadzu, TOC-VCSH, was used.

pH of the Suspension

The pH of the aqueous suspension is measured using a standard pH-meter.

Intra-Particle Porosity by Mercury Porosimetry

Tablets were made from suspensions of the surface-reacted natural calcium carbonate. The tablets are formed by applying a constant pressure to the suspension/slurry for several hours such that water is released by filtration through a fine 0.025 µm filter membrane resulting in a compacted tablet of the pigment. The tablets are removed from the apparatus and dried in an oven at 80° C. for 24 hours.

Once dried, single portions from each of the tablet blocks were characterised by mercury porosimetry for both porosity and pore size distribution using a Micromeritics Autopore IV mercury porosimeter. The maximum applied pressure of mercury was 414 MPa, equivalent to a Laplace throat diameter of 0.004 µm. The mercury intrusion measurements were corrected for the compression of mercury, expansion of the penetrometer and compressibility of the solid phase of the sample. Further details of the measuring method are described in *Transport in Porous Media* (2006) 63: 239-259.

Examples 1 to 3

In the examples, industrial process water was used comprising about 300 ppm alkyldiphenyloxide disulfonate as a surfactant. The water sample was stored for 1 day in order to allow particles to settle. Particles which settle can be easily removed in a settler or a centrifuge. Therefore the sample was taken from the supernatant. The solid content of the process water was 0.9% and the supernatant showed a solid content of 0.06%.

A surface-reacted natural calcium carbonate (SRCC) and a talc having a high surface area (HSA Talc) were added to the supernatant of the water sample.

The HSA talc had a specific surface area of 45 $m^2 g^{-1}$ and a $d_{50}$ of 0.62 µm. The surface-reacted natural calcium carbonate had a specific surface area of 40 $m^2 g^{-1}$ and a particle size measured with SEM of 2 µm.

Per 200 g supernatant of the settled process water the following amounts were added.

|  | Mineral 1 | Mineral 1 amount/g | Mineral 2 | Mineral 2 amount/g |
|---|---|---|---|---|
| Example 1 | Talc | 2 | — | — |
| Example 2 | Surface-reacted natural $CaCO_3$ | 2 | — | — |
| Example 3 | Surface-reacted natural $CaCO_3$ | 1 | HSA Talc | 1 |

Then the bottles are closed and agitated during 2 hours. Then the suspension is centrifuged, 20 minutes, C312 IG, speed 3500 rpm (2580 G). The upper and the lower phases were separated and the upper phase analysed.

Figure 2:
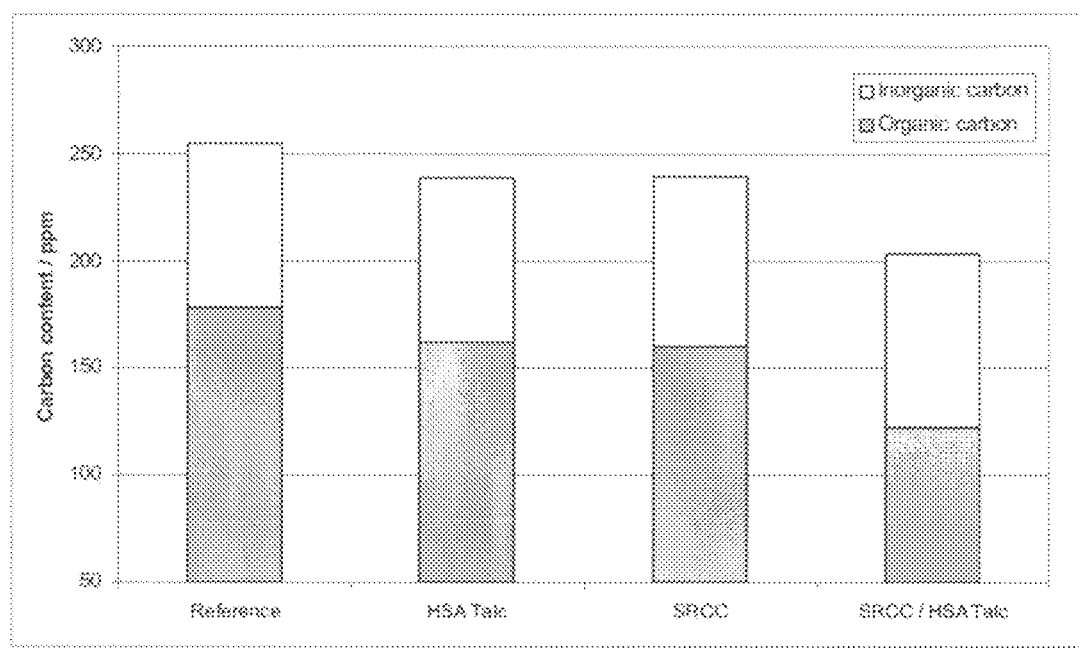
FIG. 2 shows total organic carbon (TOC) analysis of the mineral treated surfactant solution.

The results are shown in FIG. 1 and FIG. 2.

FIG. 1 shows the COD analysis of the treated surfactant solution. It is obvious that the combination of talc and surface-reacted natural calcium carbonate leads to a synergistic behaviour. This is also confirmed in FIG. 2 with the TOC analysis.

The invention claimed is:

1. A process for reducing an amount of an organic component in water, the process comprising contacting the water with a surface-reacted natural calcium carbonate and a hydrophobic adsorbent, wherein the hydrophobic adsorbent is talc, hydrophobised calcium carbonate, hydrophobised bentonite, hydrophobised kaolinite, hydrophobised glass, or any mixture thereof, wherein the surface-reacted natural calcium carbonate is a reaction product of a natural calcium carbonate with an acid and carbon dioxide formed in-situ by the acid treatment and/or supplied externally, wherein the surface-reacted natural calcium carbonate is prepared as an aqueous suspension having a pH of greater than 6.0, measured at 20° C., and wherein the at least one organic component does not include pitch.

2. A process for reducing an amount of an organic components in water, the process comprising contacting the water with a surface-reacted natural calcium carbonate and a hydrophobic adsorbent, wherein the hydrophobic adsorbent is talc, hydrophobised calcium carbonate, hydrophobised bentonite, hydrophobised kaolinite, hydrophobised glass, or any mixture thereof, wherein the surface-reacted natural calcium carbonate is a reaction product of a natural calcium carbonate with an acid and carbon dioxide formed in-situ by the acid treatment and/or supplied externally, wherein the surface-reacted natural calcium carbonate is prepared as an aqueous suspension having a pH of greater than 6.0, measured at 20° C., and wherein the at least one organic component is a surfactant, a cholesterol, an endocrine disrupting compound, an amino acid, a protein, a carbohydrate, a defoamer, a sizing agent, alkyl ketene dimer (AKD), alkenyl succinic anhydride (ASA), a polyvinylacetates; polyacrylate, a styrene-butadiene copolymer, a microorganism, a mineral oil, a vegetable oil, a fat, or any mixture thereof.

3. The process according to claim 1, wherein the organic component is a surfactant.

4. The process according to claim 1, wherein the organic compound is a stickie.

5. The process according to claim 1, wherein the surface-reacted natural calcium carbonate is prepared as an aqueous suspension having a pH of greater than 6.5, measured at 20° C.

6. The process according to claim 1, wherein the natural calcium carbonate is marble, a calcite, a chalk, a dolomite, a limestone, or mixtures thereof.

7. The process according to claim 1, wherein the acid has a $pK_a$ at 25° C. of 2.5 or less.

8. The process according to claim 1, wherein the acid has a $pK_a$ at 25° C. of 0 or less.

9. The process according to claim 1, wherein the acid is sulfuric acid, hydrochloric acid, or mixtures thereof.

10. The process according to claim 1, wherein the acid has a $pK_a$ at 25° C. of from 0 to 2.5.

11. The process according to claim 1, wherein the acid is $H_2SO_3$, $HSO_4^-$, $H_3PO_4$, oxalic acid, or any mixture thereof.

12. The process according to claim 1, wherein the natural calcium carbonate is reacted with the acid and/or the carbon dioxide in the presence of a silicate, a silica, an aluminium hydroxide, an earth alkali metal aluminate, a magnesium oxide, or any mixture thereof.

13. The process according to claim 1, wherein the natural calcium carbonate is reacted with the acid and/or the carbon dioxide in the presence of at least one silicate selected from the group consisting of an aluminium silicate, a calcium silicate, and an earth alkali metal silicate.

14. The process according to claim 1, wherein the surface-reacted natural calcium carbonate has a specific surface area of from 5 m²/g to 200 m²/g, measured using nitrogen and the BET method according to ISO 9277.

15. The process according to claim 1, wherein the surface-reacted natural calcium carbonate has a weight median grain diameter of from 0.1 to 50 µm, measured according to the sedimentation method.

16. The process according to claim 1, wherein the surface-reacted natural calcium carbonate has an intra-particle porosity within the range of 20% vol to 40% vol, measured by mercury porosimetry.

17. The process according to claim 1, wherein the surface-reacted natural calcium carbonate is contacted with the water in the form of an aqueous suspension, optionally stabilised with a dispersant.

18. The process according to claim 1, wherein the surface-reacted natural calcium carbonate is contacted with the water in the form of an aqueous suspension stabilised with a cationic dispersant, and wherein the surface-reacted natural calcium carbonate has been prepared from marble in the presence of at least one silicate.

19. The process according to claim 1, wherein the surface-reacted natural calcium carbonate is contacted with the water by suspending or adding the surface-reacted natural calcium carbonate to the water in powder form and/or in the form of granules.

20. The process according to claim 1, wherein the hydrophobic adsorbent is talc having a purity of at least 90 wt %.

21. The process according to claim 1, wherein the hydrophobic adsorbent consists of particles having a $d_{50}$ value of 0.1 to 50 µm, measured according to the sedimentation method.

22. The process according to claim 1, wherein the hydrophobic adsorbent has a specific surface area of 0.1 to 100 m²/g, measured using nitrogen and the BET method according to ISO 9277.

23. The process according to claim 1, wherein the hydrophobic adsorbent is hydrophobised calcium carbonate and/or the hydrophobised glass obtained by treatment of calcium carbonate and/or hydrophobised glass with a hydrophobising agent having the formula R—X, wherein R is a hydrocarbon residue having 8 to 24 carbon atoms and X represents a functional group selected from the group consisting of carboxyl, amine, hydroxyl, phosphonate, a polydialkylsiloxane, and any mixtures thereof.

24. The process according to claim 23, wherein the hydrophobising agent is a fatty acid having 10 to 24 carbon atoms.

25. The process according to claim 23, wherein the hydrophobic adsorbent is hydrophobised calcium carbonate having a surface area in which least 20% of the calcium carbonate is covered by the hydrophobising agent.

26. The process according to claim 23, wherein the hydrophobised calcium carbonate is prepared from a calcium carbonate selected from the group consisting of natural calcium carbonate, precipitated calcium carbonate, ground natural calcium carbonate, and any mixture thereof.

27. The process according to claim 23, wherein the hydrophobised calcium carbonate is prepared from a surface-reacted natural calcium carbonate.

28. The process according to claim 1, wherein the surface-reacted natural calcium carbonate and the hydrophobic adsorbent are mixed before being brought into contact with the water.

29. The process according to claim 1, wherein the water is brought into contact with the surface-reacted natural calcium carbonate and/or the hydrophobic adsorbent by surface filtration, depth filtration and/or alluvium filtration.

30. The process according to claim 1, wherein the water is contacted with 0.1 to 10 wt % of surface-reacted natural calcium carbonate and hydrophobic adsorbent, based on the total weight of the water.

31. The process according to claim 1, wherein the weight ratio of the surface-reacted natural calcium carbonate and the hydrophobic adsorbent is from 1:5 to 5:1.

32. The process according to claim 1, wherein the surface-reacted natural calcium carbonate and the hydrophobic adsorbent are removed from the treated water by filtration, sedimentation, and/or centrifugation.

33. The process according to claim 1, wherein the water is industrial process water, industrial waste water, drinking water, urban waste water, waste water or process water from breweries or other beverage industries, or waste water or process water in the paper industry.

34. Surface-reacted natural calcium carbonate in combination with a hydrophobic adsorbent for reducing an amount of an organic component in water, wherein the hydrophobic adsorbent is talc, hydrophobised calcium carbonate, hydrophobised bentonite, hydrophobised kaolinite, hydrophobised glass, or any mixture thereof, wherein the surface-reacted natural calcium carbonate is a reaction product of a natural calcium carbonate with an acid and carbon dioxide formed in-situ by the acid treatment and/or supplied externally, wherein the surface-reacted natural calcium carbonate is prepared as an aqueous suspension having a pH of greater than 6.0, measured at 20° C., and wherein the organic components do not comprise pitch.

35. Surface-reacted natural calcium carbonate in combination with a hydrophobic adsorbent for reducing an amount of organic component in water, wherein the hydrophobic adsorbent is talc, hydrophobised calcium carbonate, hydrophobised bentonite, hydrophobised kaolinite, hydrophobised glass, or any mixture thereof, wherein the surface-reacted natural calcium carbonate is a reaction product of a natural calcium carbonate with an acid and carbon dioxide formed in-situ by the acid treatment and/or supplied externally, wherein the surface-reacted natural calcium carbonate is prepared as an aqueous suspension having a pH of greater than 6.0, measured at 20° C., and wherein the organic component is a surfactant, cholesterol, an endocrine disrupting compound, an amino acid, a protein, a carbohydrate, a defoamer, a sizing agent, an alkyl ketene dimer (AKD), an alkenyl succinic anhydride (ASA), a polyvinylacetate, a polyacrylate, a styrene-butadiene copolymer, a microorganism, a mineral oil, a vegetable oil, a fat, or any mixture thereof.

36. A composite material comprising surface-reacted natural calcium carbonate and a hydrophobic adsorbent, wherein the surface-reacted natural calcium carbonate is a reaction product of a natural calcium carbonate with an acid and carbon dioxide formed in-situ by the acid treatment and/or supplied externally, wherein the surface-reacted natural calcium carbonate is prepared as an aqueous suspension having a pH of greater than 6.0, measured at 20° C., and wherein the organic component is a surfactant, cholesterol, an endocrine disrupting compound, an amino acid, a protein, a carbohydrate, a defoamer, a sizing agent, an alkyl ketene dimer (AKD), an alkenyl succinic anhydride (ASA), a polyvinylacetate, a polyacrylate, a styrene-butadiene copolymer, a microorganism, a mineral oil, a vegetable oil, a fat, or any mixture thereof.

* * * * *